(12) United States Patent
Korsumaki

(10) Patent No.: US 11,787,509 B2
(45) Date of Patent: Oct. 17, 2023

(54) SNOWMOBILE WITH A TUNNEL HAVING A BENDABLE PORTION

(71) Applicant: BOMBARDIER RECREATIONAL PRODUCTS INC., Valcourt (CA)

(72) Inventor: Mika Korsumaki, Rovaniemi (FI)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 191 days.

(21) Appl. No.: 17/309,126

(22) PCT Filed: Oct. 29, 2019

(86) PCT No.: PCT/EP2019/079505
§ 371 (c)(1),
(2) Date: Apr. 27, 2021

(87) PCT Pub. No.: WO2020/089214
PCT Pub. Date: May 7, 2020

(65) Prior Publication Data
US 2022/0024541 A1  Jan. 27, 2022

Related U.S. Application Data

(60) Provisional application No. 62/753,508, filed on Oct. 31, 2018.

(51) Int. Cl.
*B62M 27/02* (2006.01)

(52) U.S. Cl.
CPC ....... *B62M 27/02* (2013.01); *B62M 2027/025* (2013.01); *B62M 2027/027* (2013.01); *B62M 2027/028* (2013.01)

(58) Field of Classification Search
CPC ............ B62M 27/02; B62M 2027/021; B62M 2027/027; B62M 2027/028
(Continued)

(56) References Cited

U.S. PATENT DOCUMENTS 6,491,125 B2 * 12/2002 Girouard .................. B62J 35/00
280/247
7,594,557 B2    9/2009 Polakowski et al.
(Continued)

FOREIGN PATENT DOCUMENTS

| JP | 3-38482 | * | 2/1991 | ...... B62M 2027/021 |
| RU | 172378 U1 | | 7/2017 | |
| WO | 2010062293 A1 | | 6/2010 | |

OTHER PUBLICATIONS

Grant Decision issued by the Rospatent dated Dec. 14, 2022 in connection with the corresponding application No. 2021114578 and including Search Report.
(Continued)

*Primary Examiner* — Anne Marie M Boehler
(74) *Attorney, Agent, or Firm* — BCF LLP

(57) ABSTRACT

A snowmobile has a frame, a tunnel, at least one ski operatively connected to the frame, a motor supported by the frame, and an endless drive track operatively connected to the motor. The tunnel extends above the endless drive track and has a first part and a second part. The second part extends rearward from the first part. The first part is made of a first material. The second part is made of a second material that is resilient. The second material is different from the first material. When a downward force is applied to a rear end of the second part, the second part bends downward from an original configuration such that the rear end of the second part moves toward the endless drive track. The second part returns at least approximately to its original configuration after removal of the downward force.

20 Claims, 10 Drawing Sheets

(58) Field of Classification Search
USPC .......................................................... 180/190
See application file for complete search history.

(56) References Cited

U.S. PATENT DOCUMENTS

| | | | | |
|---|---|---|---|---|
| 2002/0027028 A1* | 3/2002 | Girouard | ................ | B62M 27/02 |
| | | | | 280/847 |
| 2004/0090119 A1* | 5/2004 | Ebert | ................ | B62M 27/02 |
| | | | | 305/185 |
| 2007/0193715 A1* | 8/2007 | Bergman | ................ | B60K 11/04 |
| | | | | 165/41 |
| 2015/0197149 A1* | 7/2015 | Hedlund | ................ | B60K 13/02 |
| | | | | 180/309 |
| 2016/0194021 A1* | 7/2016 | Vezina | ................ | B62M 27/02 |
| | | | | 180/190 |
| 2018/0178869 A1* | 6/2018 | Labbe | ................ | B62M 27/02 |
| 2020/0148291 A1* | 5/2020 | Telford | ................ | B62D 55/108 |
| 2020/0339200 A1* | 10/2020 | Couture | ................ | B62D 25/18 |

OTHER PUBLICATIONS

International Search Report of PCT/EP2019/079505; Fernandez Palza, P.; dated Jan. 3, 2020.
Powermodz; Tunnel Extension Part 1! SKIDOO 700 Rev Mod Sled, Powermodz!; Feb. 14, 2013 retrieved from https://www.youtube.com/watch?v=P9dIwAKEuro on Apr. 27, 2021.

* cited by examiner

SNOWMOBILE WITH A TUNNEL HAVING A BENDABLE PORTION

The present application claims priority to U.S. Provisional Patent Application No. 62/753,508, filed on Oct. 31, 2018, the entirety of which is incorporated herein by reference.

TECHNICAL FIELD

The present technology relates to snowmobile tunnels having a bendable portion and to snowmobiles having such tunnels.

BACKGROUND

Snowmobiles are propelled by endless drive tracks disposed under a tunnel which is made of metal and on which the seat typically rests. In some cases, the tunnel includes a metal extension for accommodating a longer endless drive track. As a snowmobile moves forward over snow, the endless drive track projects snow rearward beyond the tunnel. The tunnel blocks and redirects at least some of the snow being projected by the endless drive track backward and upward.

Although effective to reduce the amount of snow projected rearward and upward beyond the tunnel, prior art tunnels have a common drawback. The tunnels are inflexible and can become permanently damaged upon certain impacts. For example, it is possible for a snowmobile to land on the rear end of the tunnel, especially in a racing environment, or for another snowmobile to run into the rear of another snowmobile. The rear end extends rearward beyond any attachment points with the rear suspension or other frame components and thus is cantilevered which renders the rear end vulnerable to damage. When this happens, the tunnel deforms and cannot be returned to its original shape unless machines are used to remove the deformation. In some such cases, the tunnel is permanently damaged and cannot be returned to its original shape.

SUMMARY

It is an object of the present technology to ameliorate at least some of the inconveniences present in the prior art.

In summary, the present technology provides a tunnel constructed of two parts: a metal part, and a resilient part that is removably connected to the metal part. The resilient part is made of a resilient material and has a geometry that in combination with the resilient material allows the resilient part to bend downward when a downward force is applied to the rear of the snowmobile, such as when the snowmobile is impacted from the rear by another snowmobile for example. The combination of the resilient material and the geometry of the resilient part also allows a user of the snowmobile to lift the rear end of the snowmobile by a rear end of the resilient part of the tunnel without the resilient part materially bending upward beyond an original configuration thereof.

According to one aspect of the present technology, there is provided a snowmobile comprising a frame, the frame including a tunnel, at least one ski operatively connected to the frame, a motor supported by the frame, and an endless drive track operatively connected to the motor for propelling the snowmobile.

The tunnel extends above the endless drive track in a longitudinal direction, and has a first part and a second part. A front end of the second part is connected to a rear end of the first part. The second part extends rearward from the first part. The first part is made of a first material. The second part is made of a second material. The second material is different from the first material and the second material is resilient.

When a downward force is applied to a rear end of the second part, the second part bends downward from an original configuration such that at least the rear end of the second part moves toward the endless drive track. The second part returns at least approximately to its original configuration after removal of the downward force.

In some embodiments, when an upward force is applied to the rear end of the second part, the second part resists bending upward to allow a user to lift a rear end of the snowmobile by the rear end of the second part.

In some embodiments, the second part returns to its original configuration after the downward force is removed.

In some embodiments, snowmobile further comprises a snow flap connected to the second part of the tunnel and extending at least in part downward from the rear end of the second part.

In some embodiments, the second part of the tunnel includes: at least two ribs extending in the longitudinal direction, each of the at least two ribs having an inverted-U shape; and a web connected to the at least two ribs along at least a portion of a length of each of the at least two ribs.

In some embodiments, each of the at least two ribs includes an outer sidewall facing away from a longitudinal center plane of the snowmobile, an inner sidewall facing toward the longitudinal center plane, and an upper wall connecting the outer sidewall at a top end thereof to the inner sidewall at a top end thereof.

In some embodiments, the outer sidewall flares away from the inner sidewall as the outer sidewall extends downward from the upper wall.

In some embodiments, the outer sidewall is flat when the second part of the tunnel is in the original configuration; and the inner sidewall is flat when the second part of the tunnel is in the original configuration.

In some embodiments, the upper wall comprises a plurality of flat sections.

In some embodiments, the outer sidewall extends away from the longitudinal center plane as the outer sidewall extends downward from the upper wall; and the inner sidewall extends toward the longitudinal center plane as the inner sidewall extends downward from the upper wall.

In some embodiments, each of the at least two ribs includes a lip; and for each lip of each of the at least two ribs: a top end of the lip is connected along a bottom edge of the outer sidewall; and the lip extends away from the longitudinal center plane as the lip extends downward from the outer sidewall.

In some embodiments, the lip comprises a plurality of flat sections, the top end of the lip defining a top end of each flat section of the plurality of flat sections.

In some embodiments, the at least two ribs include a left side rib and a right side rib; a front end of the left side rib is connected at a rear left corner of the first part of the tunnel; a front end of the right side rib is connected at a rear right corner of the first part of the tunnel; and the web extends in the lateral direction between the left side rib and the right side rib and connects the left side rib to the right side rib.

In some embodiments, the left side rib tapers from the front end of the left side rib to a rear end of the left side rib, and the right side rib tapers from the front end of the right side rib to a rear end of the right side rib.

In some embodiments, the snowmobile further comprises a bumper connected between rear ends of the left and right side ribs.

In some embodiments, the bumper is a cylindrical bar.

In some embodiments, the snowmobile further comprises a light supported by the rear end of the second part.

In some embodiments, the web includes a first plurality of sections extending in a transverse direction and a second plurality of sections extending in a vertical direction.

In some embodiments, the first plurality of sections and the second plurality of sections of the web are interconnected to define a plurality of inverted U-shaped portions positioned between the left and right side ribs.

In some embodiments, the web is X-shaped; and the web has a front left extremity connected to the left side rib, a front right extremity connected to the right side rib, a rear left extremity connected to the left side rib rearward of the front left extremity, and a rear right extremity connected to the right side rib rearward of the front right extremity.

In some embodiments, when the second part bends downward from the original configuration, the second part bends between the front left and rear left extremities and between the front right and rear right extremities.

In some embodiments, the X-shaped web is symmetric about a longitudinal center plane of the snowmobile; and the X-shaped web is positioned closer to the front end of the second part of the tunnel than to the rear end of the second part of the tunnel.

In some embodiments, when the second part bends downward from the original configuration, the second part bends at a location that is closer to the front end of the second part of the tunnel than to the rear end of the second part of the tunnel.

In some embodiments, the front end of the second part of the tunnel is removably connected to the rear end of the first part of the tunnel.

In some embodiments, the first material is a metal.

In some embodiments, the second material is a plastic.

In some embodiments, the second part of the tunnel is curved when viewed from a lateral side of the snowmobile.

In some embodiments, the rear end of the first part has beveled corners and the front end of the second part has corresponding beveled portions that mate with the beveled corners.

In some embodiments, a part of each of the outer sidewalls flares away from the longitudinal center plane when the second part bends downward from the original configuration.

According to one aspect of the present technology, there is provided a snowmobile that comprises a frame, the frame including a tunnel, at least one ski operatively connected to the frame, a motor supported by the frame, an endless drive track operatively connected to the motor for propelling the snowmobile, and a bumper.

The tunnel extends above the endless drive track in a longitudinal direction, and has a first part and a second part, a front end of the second part being connected to a rear end of the first part, the second part extending rearward from the first part. The bumper is connected to a rear end of the second part. The first part is made of a first material. The second part is made of a second material. The second material is different from the first material. The second material is resilient.

When a downward force is applied to the rear end of the second part, the second part bends downward from an original configuration such that at least the bumper moves toward the endless drive track. The second part returns at least approximately to its original configuration after removal of the downward force.

These examples are non-limiting.

For purposes of this application, terms related to spatial orientation such as forward, rearward, upward, downward, left, and right, as they are used in this document refer to general directions as would be understood by a driver of a snowmobile sitting on a driver seat of the snowmobile and facing in a straight forward driving direction. Terms related to spatial orientation when describing or referring to components or sub-assemblies of a snowmobile separately from the snowmobile should be understood as they would be understood when these components or sub-assemblies are mounted to the snowmobile, unless specified otherwise in this application.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
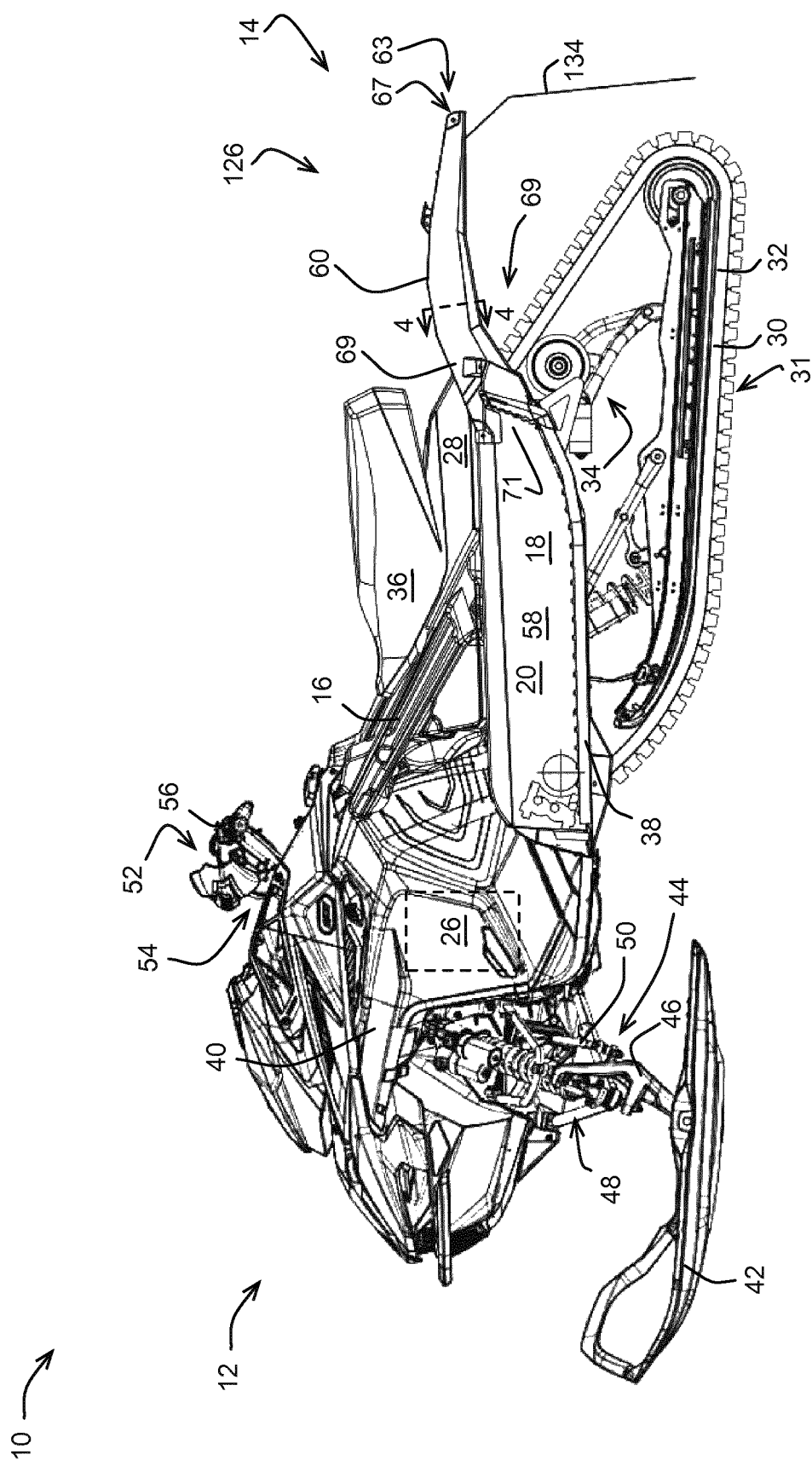
FIG. 1 is a left side elevation view of a snowmobile.
Figure 2:
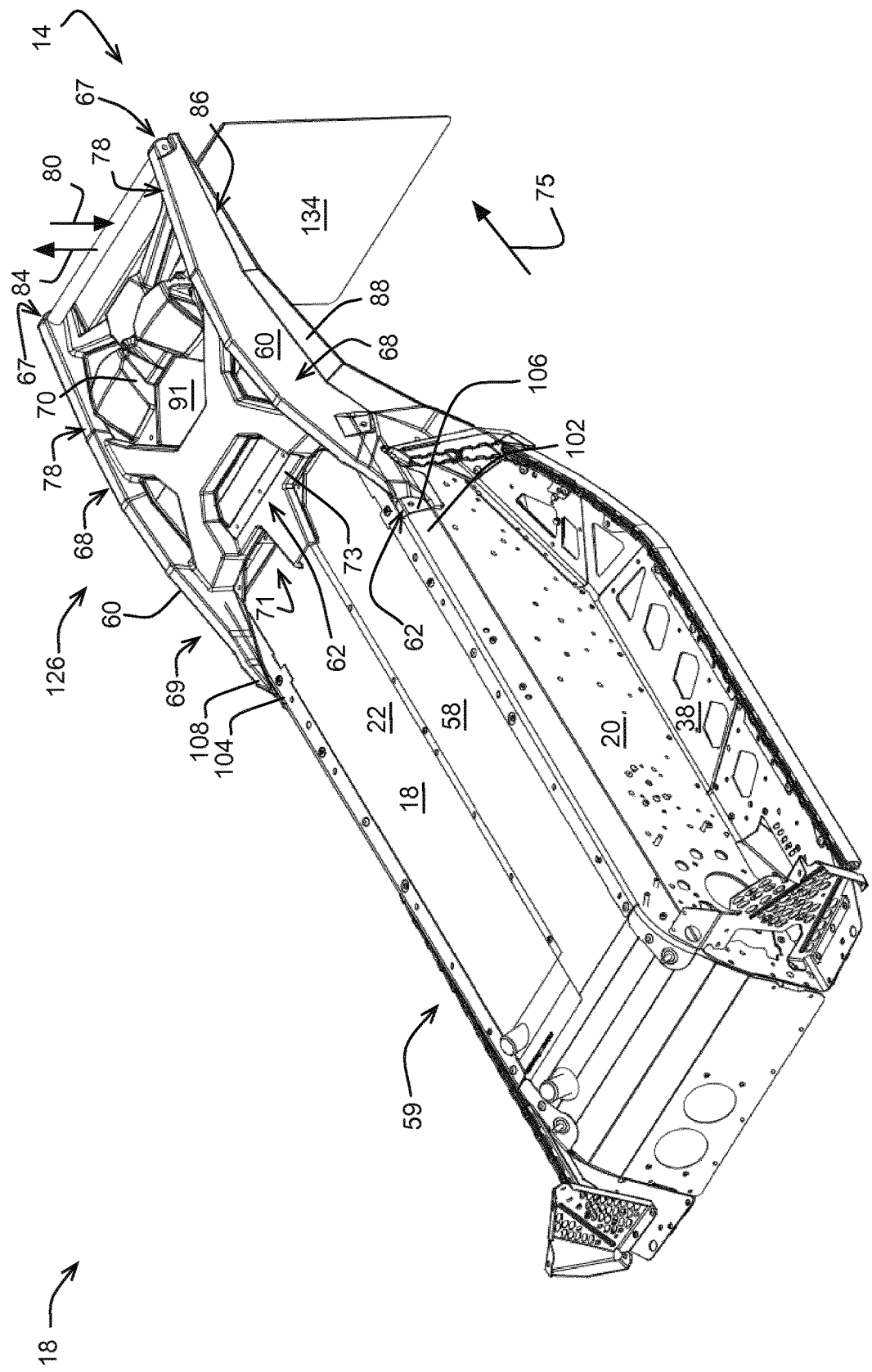
FIG. 2 is a perspective view of a tunnel of the snowmobile of FIG. 1, taken from a front left, top side thereof.

With reference to FIGS. 1 and 2, a snowmobile 10 includes a front end 12 and a rear end 14 which are defined consistently with a travel direction of the snowmobile 10.

The snowmobile 10 has a frame 16. The frame 16 includes a tunnel 18. In the present embodiment, the tunnel 18 has an inverted U-shape when viewed from the front end 12 or the rear end 14. In the present embodiment, the inverted U-shape tunnel 18 has left and right side portions 20 and a central portion 22 extending between the side portions.

A motor 26, schematically illustrated in dotted lines in FIG. 1, is supported by the frame 16 forward of the tunnel 18. In the illustrated embodiment, the motor 26 is an internal combustion engine, but it is contemplated that it could be, for example, an electric motor or another type of motor. A fuel tank 28, supported on the tunnel 18, stores fuel to be supplied to the motor 26. Other locations of the fuel tank 28 are contemplated.

An endless drive track 30 is disposed below the tunnel 18. The endless drive track 30 has an endless belt 32 and plurality of external lugs 31 extending from an outer surface thereof. The endless drive track 30 is operatively connected to the engine 26 via a drivetrain including a continuously variable transmission (CVT) (not shown) and a chain and sprocket assembly (not shown).

The chain and sprocket assembly is housed inside a chain case (not shown). Other types of drivetrains are contemplated. The endless drive track 30 is driven by the engine 26 to run about a rear suspension assembly 34 connected to the tunnel 18 for propulsion of the snowmobile 10. The rear suspension assembly 34 supports and tensions the endless drive track 30. It is contemplated that the snowmobile 10 could be provided with a different embodiment of a rear suspension assembly than the one shown.

A straddle seat 36 is positioned atop the fuel tank 28. The seat 36 is adapted to accommodate a driver of the snowmobile 10. It is contemplated that the seat 36 could also be configured to accommodate one or more passengers. It is also contemplated that the snowmobile 10 could include an additional one or more seats for passengers.

A footrest 38 is positioned on each side of the snowmobile 10 below the seat 36 to accommodate the driver's feet. Each of the left and right footrests 38 extends generally laterally outwardly from the corresponding left and right side portion 20 of the tunnel 18. In the illustrated embodiment, the footrests 38 are fastened to their respective side portion 20. It is however contemplated that the footrest 38 could be formed integrally with the side portions 20 of the tunnel 18.

At the front end 12 of the snowmobile 10, fairings 40 enclose the engine 26, part of the drive train and other components of the snowmobile 10 such as the air intake system (not shown). Two skis 42 are positioned at the front end 12 of the snowmobile 10. Each ski 42 is attached to the frame 16 through a corresponding front suspension assembly 44. Each front suspension assembly 44 includes a ski leg 46, a shock absorber assembly 48, two A-arms 50 and ball joints (not labeled). Other types of front suspension assemblies are contemplated. It is contemplated that the snowmobile 10 could have a different number of skis 42, such as for example a single ski 42 disposed centrally in the front end 12 of the snowmobile 10.

A steering assembly 52, including a steering column 54 and a handlebar 56, is provided forward of the seat 36. The steering column 54 is rotationally connected to the frame 16. The handlebar 56 is connected to the upper end of the steering column 54. The handlebar 56 is used to rotate the steering column 54, and thereby the skis 42, in order to steer the snowmobile 10.

The snowmobile 10 includes other components such as a display cluster, an exhaust system, an air intake system, and the like. As it is believed that these components would be readily recognized by one of ordinary skill in the art, further explanation and description of these components will not be provided herein.

The tunnel 18 will now be described in more detail.

Figure 3:
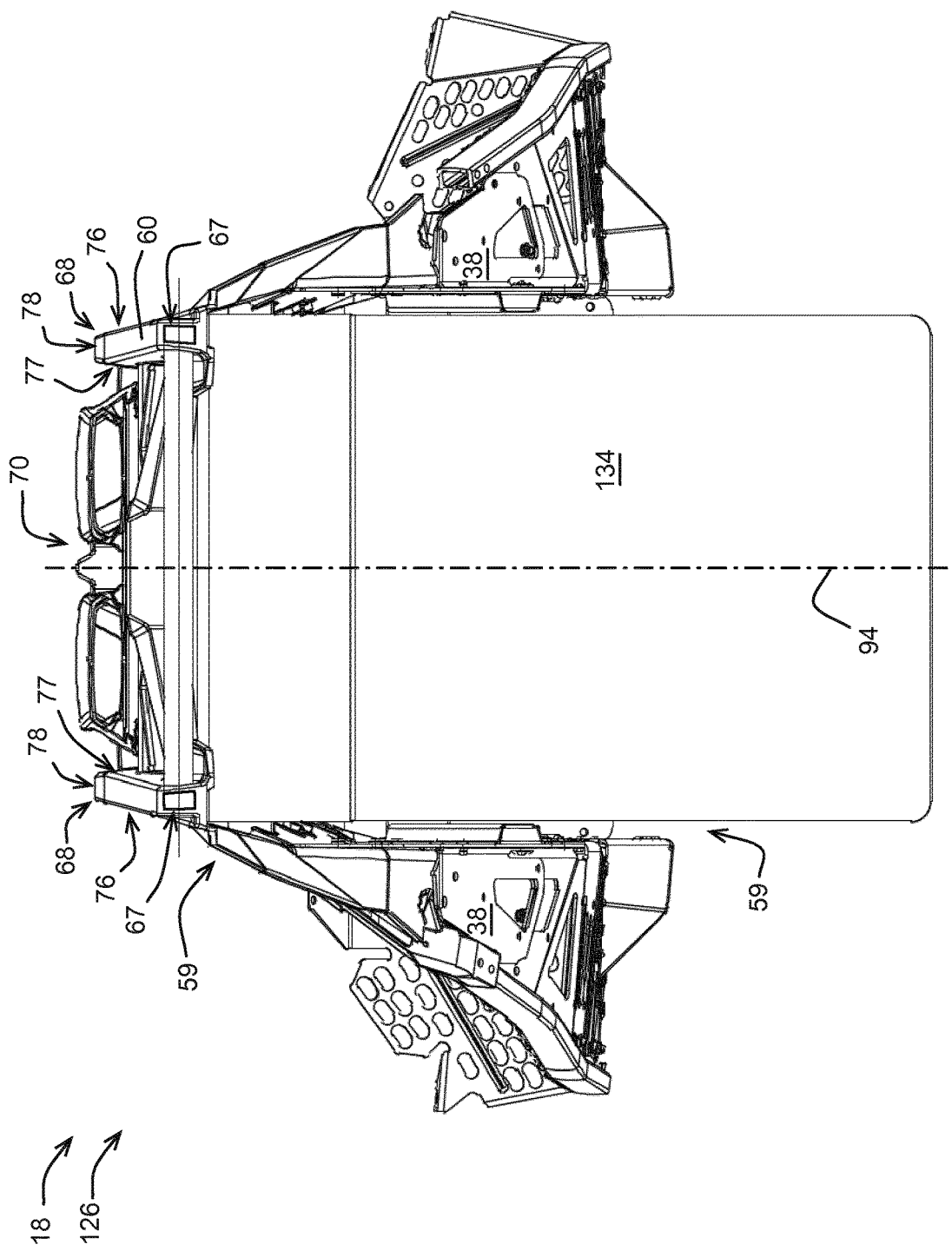
FIG. 3 is an elevation view of the tunnel of FIG. 2, taken from a rear side thereof.

As shown in FIGS. 1 and 2, the tunnel 18 has a metal part 58 which supports the fuel tank 28 and the seat 36 the thereon. In the present embodiment, the metal part 58 of the tunnel 18 is formed from sheet metal parts assembled to form an inverted U-shape 59 which is best seen in FIG. 3. It is contemplated that the metal part 58 could be made of one or more other materials and/or could have a different construction.

The tunnel 18 also has a resilient part 60 which is made of a resilient material. In the present embodiment, the resilient part 60 supports brake lights 67 at a rear end 63 thereof. The brake lights 67 are shown in FIGS. 1 and 2 only, to maintain clarity of the rest of the figures. It is contemplated that the brake lights 67 could be positioned elsewhere on the resilient part 60 and/or elsewhere on the snowmobile 10, or could be omitted. In the present embodiment, the resilient material is a Polyethylene plastic such as High-density polyethylene (HDPE). Other suitable materials are contemplated.

A front end 69 of the resilient part 60 is connected to a rear end 71 of the metal part 58 of the tunnel 18. As best shown in FIG. 2, the resilient part 60 is bolted at its front end 69 to the rear end 71 of the metal part 58 of the tunnel 18. The bolted connection is shown with reference numeral 62 in FIG. 2.

Figure 4:
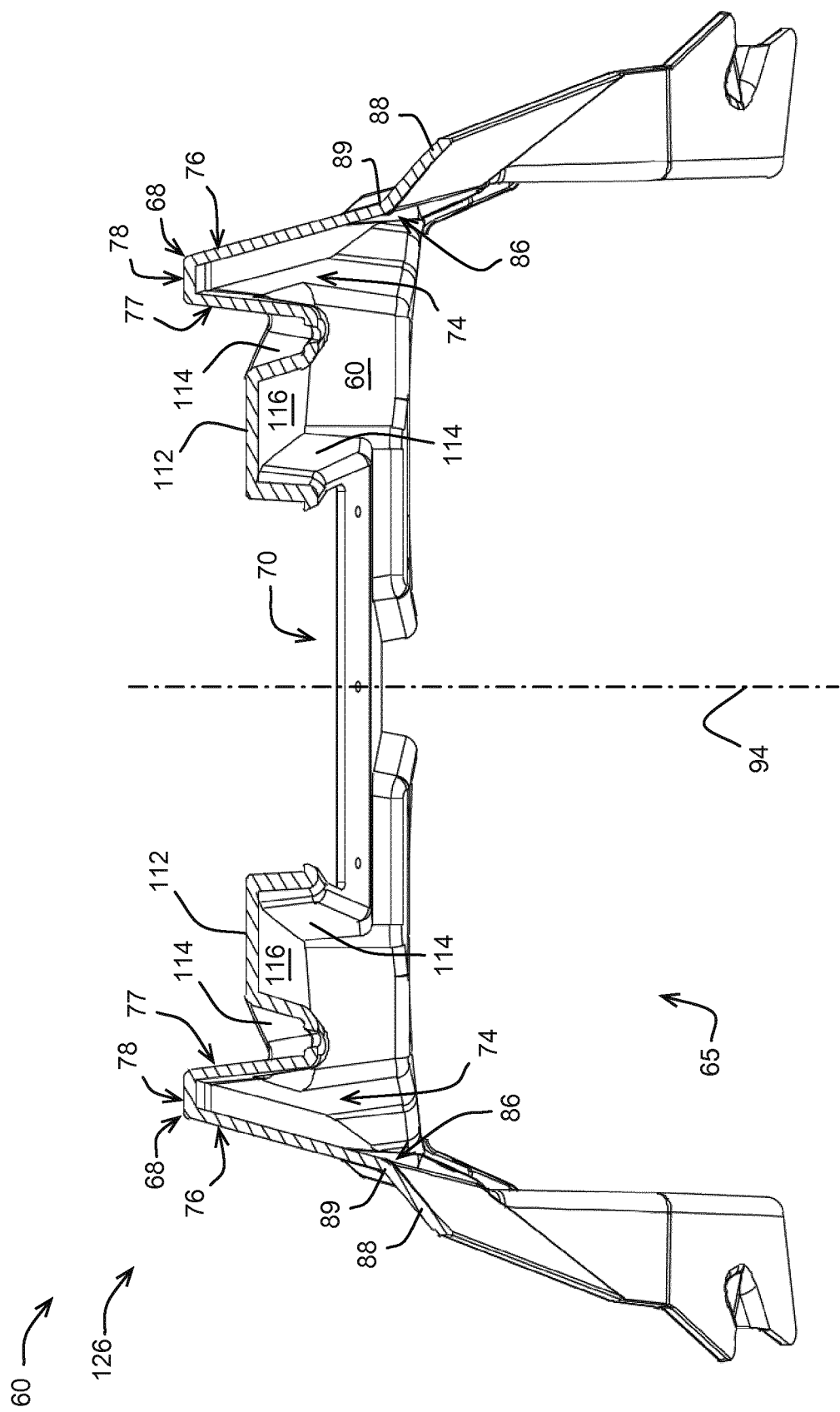
FIG. 4 is a cross-sectional view of a part of the tunnel of FIG. 2, taken along section line 4-4 of FIG. 1.

Referring to FIGS. 2 to 4, in the present embodiment, the resilient part 60 of the tunnel 18 is formed into an inverted U-shape 65. The U-shape 65 has a width that in the present embodiment is slightly larger than a width of the inverted U-shape 59 of the rear end 71 of the metal part 58 of the tunnel 18. The U-shape 65 of the front end 69 of the resilient part 60 fits over and mates with the U-shape 59 of the rear end 71 of the metal part 58.

Even more particularly, and referring to FIGS. 2 to 4, the resilient part 60 has left and right side ribs 68 and a central portion 70 extending between the side ribs 68. The left and right side ribs 68 are bolted at their front ends to respective rear left and rear right corners of the rear end 71 of the metal part 58 of the tunnel 18 and extend rearward from the rear end 71 of the metal part 58 in a longitudinal direction 75.

To provide for additional rigidity, the rear end 71 of the metal part 58 has beveled corners 102, 104 and the front end 69 of the resilient part 60 has corresponding beveled portions 106, 108 that connect and mate with the beveled corners 102, 104 of the metal part 58.

Also in order to provide additional rigidity, a front end 73 of the central portion 70 is bolted to the rear end 71 of the metal part 58 of the tunnel 18. It is contemplated that a different means of removably connecting the resilient part 60 to the metal part 58 could be used. For example, the resilient part 60 could be screwed to the metal part 58. As another example, a snap fit connection between the resilient part 60 and the metal part 58 could be used.

The resilient part 60 extends rearward from the metal part 58 over a rear portion of the endless drive track 30. Also in the present embodiment, the resilient part 60 is curved when viewed from a lateral side of the snowmobile 10. More particularly, as best seen in FIG. 2, the left and right side ribs 68 extend upward above the central portion 22 of the metal part 58 of the tunnel 18 as they extend rearward from the rear end 71 of the metal part 58. The left and right side ribs 68 then extend downward to form the curved shape of the resilient part 60 when viewed from a lateral side of the snowmobile 10.

The upward extension in the left and right side ribs 68 provides for additional space between the resilient part 60 and the endless drive track 30. However in other embodiments, the ribs 68 extend rearward from the rear end of the metal part 58 generally in line with the central portion 22 of the metal part 58. The left and right side ribs 68 also taper from their respective front ends to their respective rear ends.

As best shown in FIG. 4, each of the side ribs 68 has an upside down U-shape 74. The U-shape 74 of each of the side ribs 68 is defined by an outer sidewall 76, an inner sidewall 77, and an upper wall 78 that joins the outer sidewall 76 to the inner sidewall 77 at top ends thereof.

In the present embodiment, and as shown in FIG. 4, the outer sidewalls 76 of the side ribs 68 face away from a longitudinal center plane 94 of the snowmobile 10, while the inner sidewalls 77 face toward the longitudinal center plane 94. Further in the present embodiment, and also as shown in FIG. 4, the outer sidewalls 76 of the side ribs 68 flare away from the respective inner sidewalls 77 as the sidewalls 76 extend downward from the respective upper walls 78.

Figure 5:
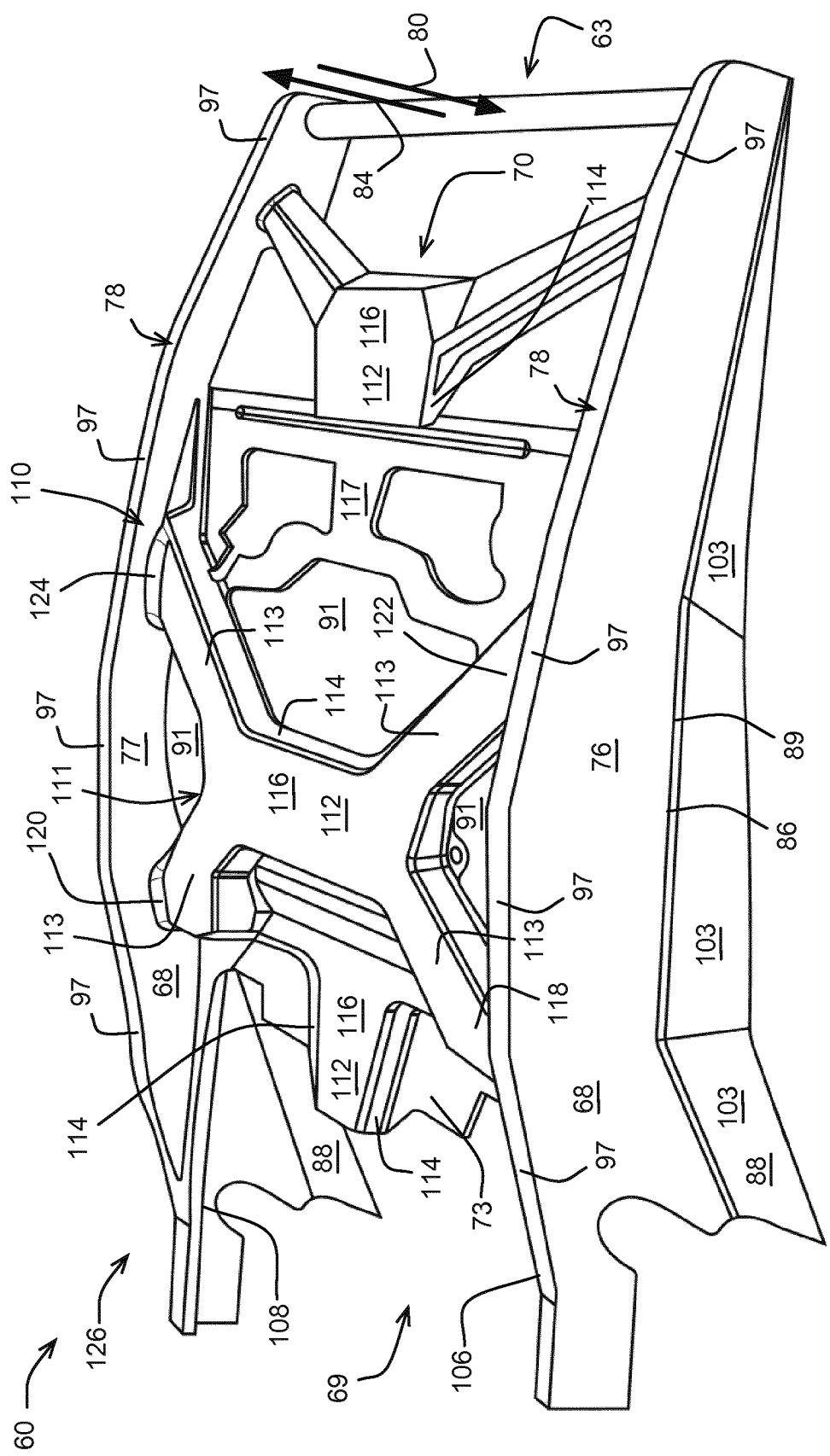
FIG. 5 is a perspective view of a resilient part of the tunnel of FIG. 2, taken from a left, top side thereof, the resilient part being in an original configuration thereof.

Referring to FIGS. 4 and 5, each of the left and right side ribs 68 includes a lip 88. As shown, each of the lips 88 is connected at a top end 89 thereof along a bottom edge 86 of the corresponding one of the outer sidewalls 76. The outwardly extending lips 88 extend along a length the bottom edge 86 of the respective one of the left and right side ribs 68. Each of the lips 88 extends away from a longitudinal center plane 94 of the snowmobile 10 as the lip 88 extends downward from the corresponding outer sidewall 76.

In the present embodiment, the sidewalls 76, 77 of the left and right side ribs 68 are flat. The upper wall 78 of each of the left and right side ribs 68 has a plurality of flat sections 97. Similarly, the lip 88 of each of the left and right side ribs 68 has a plurality of flat sections 103, with the top end 89 of each of the lips 88 defining a top end of each flat section of the plurality of flat sections 103 of that lip 88.

In the present embodiment, the outer sidewalls 76 of the left and right side ribs 68 are shaped to have a greater surface area than the respective inner sidewalls 77 of the left and right side ribs 68. Also, the bottom edges 86 of the outer sidewalls 76 are connected along their lengths to the respective ones of the outwardly extending lips 88.

This structure helps the resilient part 60 resist upward bending when the snowmobile 10 is lifted by the rear end 63 of the resilient part 60, but adds only an immaterial amount of resistance to the downward elastic buckling of the resilient part 60.

Referring to FIG. 5, the central portion 70 of the resilient part 60 includes a web 110 extending in a lateral direction between the left side rib 68 and the right side rib 68. The web 110 connects the left and right side ribs 68 along portions of a length of each of the left and right side ribs 68.

The web 110 is X-shaped. In the present embodiment, the X-shaped portion 111 is symmetric about the longitudinal center plane 94 of the snowmobile 10 and is positioned closer to the front end 69 of the resilient part 60 than the rear end 63 of the resilient part 60.

The X-shaped portion 111 has four U-shaped arms 113. The arms 113, together with other portions of the web 110 and with the left and right side ribs 68, define apertures 91. It is contemplated that the apertures 91 could be omitted (see the alternative embodiment of the resilient part 140 in FIG. 8 for example).

Each of the four arms 113 terminates at a respective one of a front left extremity 118 connected to the left side rib 68, a front right extremity 120 connected to the right side rib 68, a rear left extremity 122 connected to the left side rib 68 rearward of the front left extremity 118, and a rear right extremity 124 connected to the right side rib 68 rearward of the front right extremity 120.

In the present embodiment, the extremities 118, 120, 122, 124 are part of the X-shaped portion 111. In this configuration, the arms 113 provide structural reinforcement against upward bending of the resilient part 60.

The web 110 further includes sections 112 extending in both transverse and longitudinal directions and sections 114 extending in a vertical direction. These sections 112, 114 define the arms 113 and central inverted U-shaped portions 116 of the web 110. The arms 113 and the central U-shaped portions 116 are positioned between the left and right side ribs 68. The arms 113 and the central U-shaped portions 116 are interconnected by a flat portion 117.

Further in the present embodiment, a snow flap 134, seen in FIG. 2, is connected to an underside of the resilient part 60 and hangs down toward the ground 125 from the rear end 63 thereof. The snow flap 134 covers the various apertures, including the apertures 91, defined in the resilient part 60 and thereby keeps snow away from being ejected upward through the apertures.

The snow flap 134 is made of a flexible piece of material, such as an ultra-high molecular weight polyethylene ("UHMWPE"). It is contemplated that the snow flap 134 could be made of a different flexible material, such as a rubber.

Figure 8:
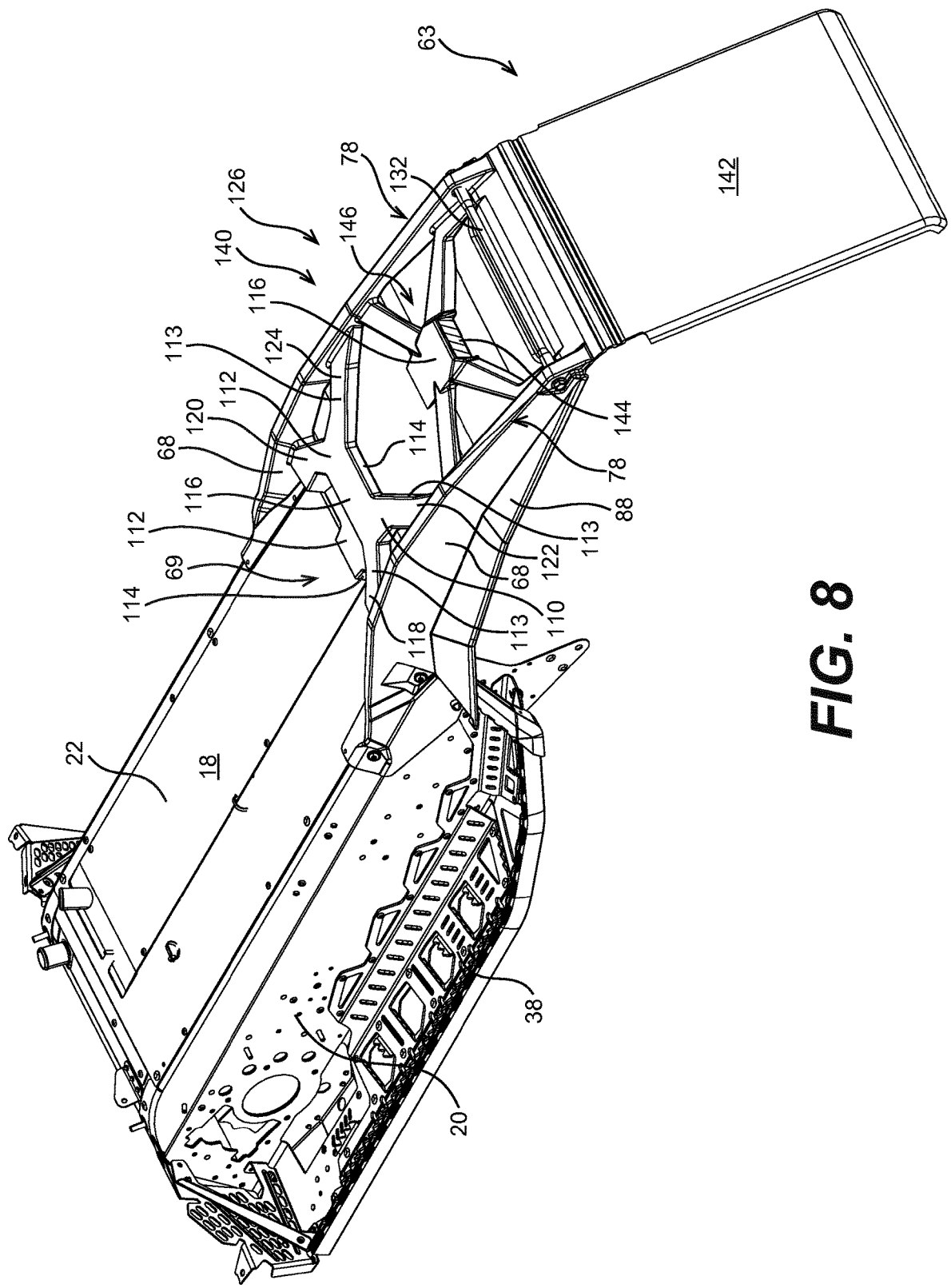
FIG. 8 illustrates an alternative embodiment of the resilient part of the tunnel of FIG. 5, taken from a rear left, top side thereof.

In some embodiments, such as in the alternative embodiment of the resilient part 140 shown in FIG. 8, the snow flap 142 is integrally formed with the resilient part 140. The resilient part 140 in FIG. 8 is similar to the resilient part 60. Therefore, parts of resilient part 140 have been labeled with the corresponding parts of the resilient part 60, and will not be described herein in detail. As shown, the snow flap 142 of the resilient part 140 is integrally formed with the resilient part 140 and is made of the same plastic as the resilient part 140. One difference from the resilient part 60, is that the resilient part 140 has a single light 144 in the central portion 146 thereof. Another difference from the resilient part 60 is that the central portion 146 of the resilient part 140 has no apertures therein.

In FIGS. 1 to 5, the structure and the resilient plastic material of the resilient part 60 described herein above are in an original configuration 126. In FIG. 8, the resilient part 140 is also in the original configuration 126. The resilient part 140 is constructed similar to the resilient part 60 and has the same resulting properties as are described below with regard to the resilient part 60. The resulting properties of the resilient part 140 are therefore not described herein in detail.

Figure 6A:
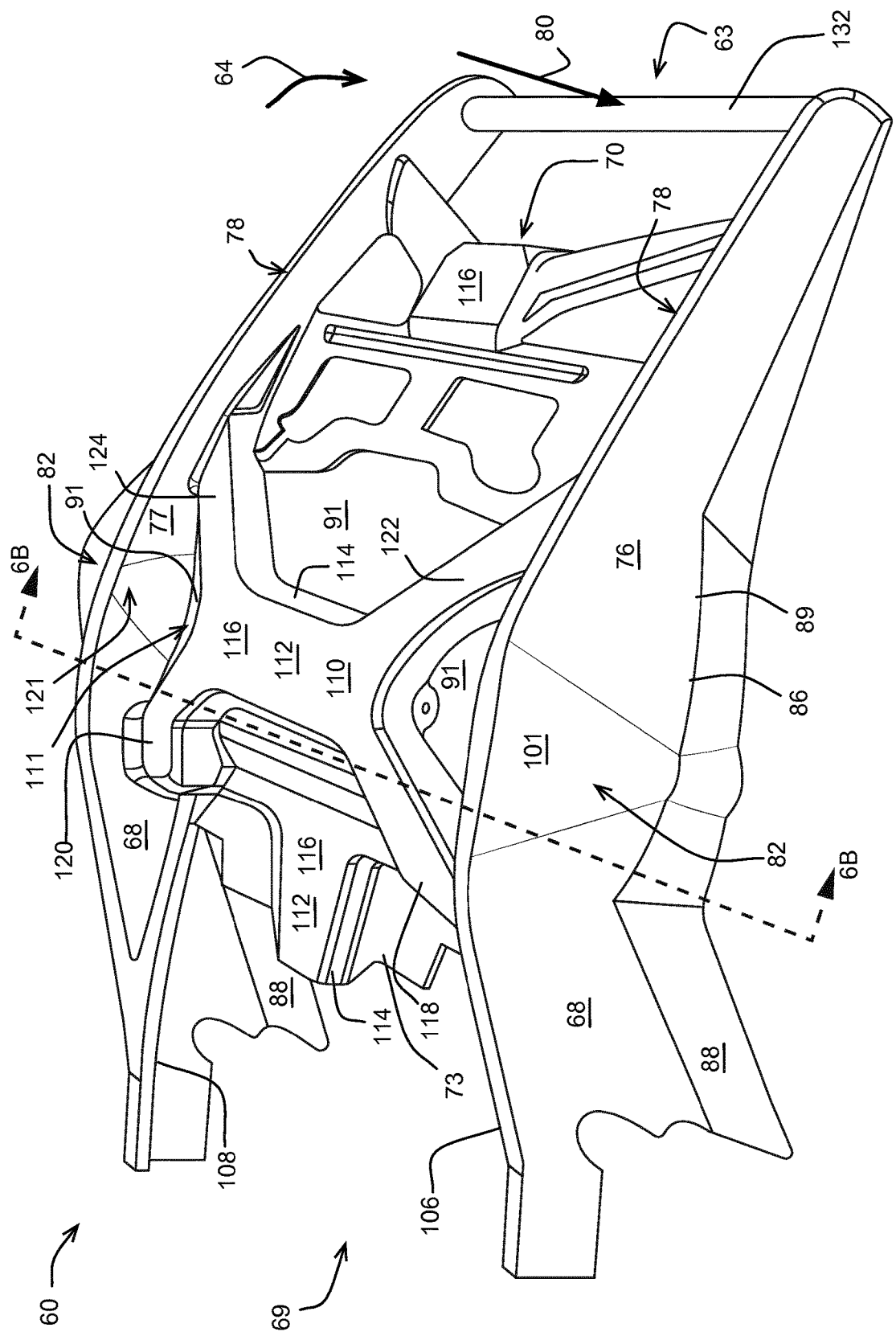
FIG. 6A is a perspective view of a resilient part of the tunnel of FIG. 2, taken from a left, top side thereof, the resilient part being elastically bent downward from the original configuration.
Figure 6B:
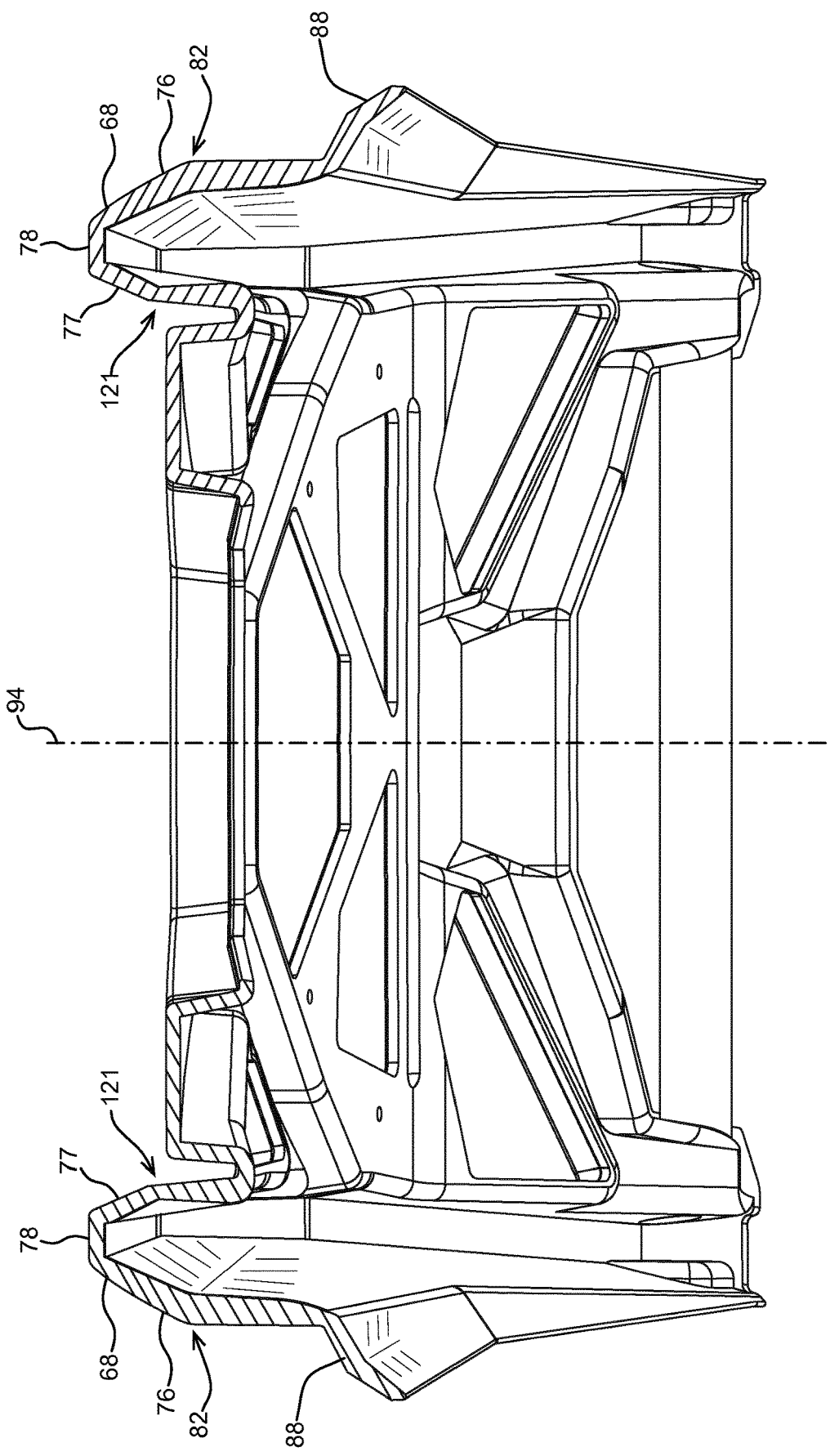
FIG. 6B is a cross-sectional view of another part of the resilient part of FIG. 6A, taken along section line 6B-6B of FIG. 6A, the resilient part being bent downward from the original configuration.

Now referring to FIGS. 6A and 6B, a downward force 80 applied to the rear end 63 of the resilient part 60 puts the outer and inner sidewalls 76, 77 of the side ribs 68 in compression at least at a bottom part of the sidewalls 76, 77, while the upper walls 78 experience tension.

When the magnitude of the downward force 80 is sufficient, the force 80 causes the sidewalls 76, 77 to elastically buckle outwards relative to each other as shown with reference numerals 82 in FIGS. 6A and 6B.

The elastic buckling (within an elastic deformation limit of the plastic) of the sidewalls 76, 77 and the lips 88 allows the resilient part 60 of the tunnel 18 to elastically bend downward from the original configuration 126 thereof toward the endless drive track 30 as shown with arrow 64 in FIG. 6A.

In the present embodiment, and as shown in FIGS. 6A and 6B, with the elastic buckling of the sidewalls 76, 77 and the lips 88, a part of each of the outer sidewalls 76, and a part of each of the lips 88, flares away from the longitudinal center plane 94 to form an hourglass shape 101 (FIG. 6A). Also in the present embodiment, with the elastic buckling of the sidewalls 76, 77 and the lips 88, a part of each of the inner sidewalls 77 flares toward the longitudinal center plane 94 as shown with reference numeral 121 in FIG. 6B. This happens at least in part due to the rigidity provided by the upper walls 78 to the upper parts of the respective ones of the side walls 76 and 77 which increases the resistance of the side walls 76 and 77 to buckling toward each other.

As shown in FIG. 6A, the downward bending 64 of the resilient part 60 from the original configuration 126 thereof occurs between the front left and rear left extremities 118, 122 and between the front right and rear right extremities 120, 124 of the X-shaped portion 111, closer to the front end 69 of resilient part 60 than to the rear end 63 of resilient part 60.

After the downward force 80 is removed, the resilience of the structure of the resilient part 60 described above returns the resilient part 60 to the original configuration 126 thereof. It is contemplated that in some cases, and depending on the magnitude of the downward force 80 for example, some plastic deformation of the resilient part 60 could occur during bending of the resilient part 60. In at least some such cases, after removal of the downward force 80, the resilient part 60 could return approximately but not fully to the original configuration 126.

In at least some cases, the elastic bending 64 and returning to the original configuration 126 allow the resilient part 60 to not break and to continue to be useable even after the elastic bending 64. For example, in at least some cases when the snowmobile 10 is hit with another snowmobile (not shown) from behind, the rear end 63 will bend downward and will thereafter return at least approximately to its original configuration 126 after the other snowmobile (not shown) is removed away from the snowmobile 10.

It is contemplated that in some cases, and depending on the magnitude of the downward force 80 for example, the resilient part 60 could be broken. It is contemplated that in such cases the resilient part 60 can be easily replaced by, in the present embodiment, unbolting it from the rear end 71 of the metal part 58 of the tunnel 18 and by bolting (in embodiments having a bolted connection to the metal part 58) a replacement resilient part 60 in its place.

Figure 6C:
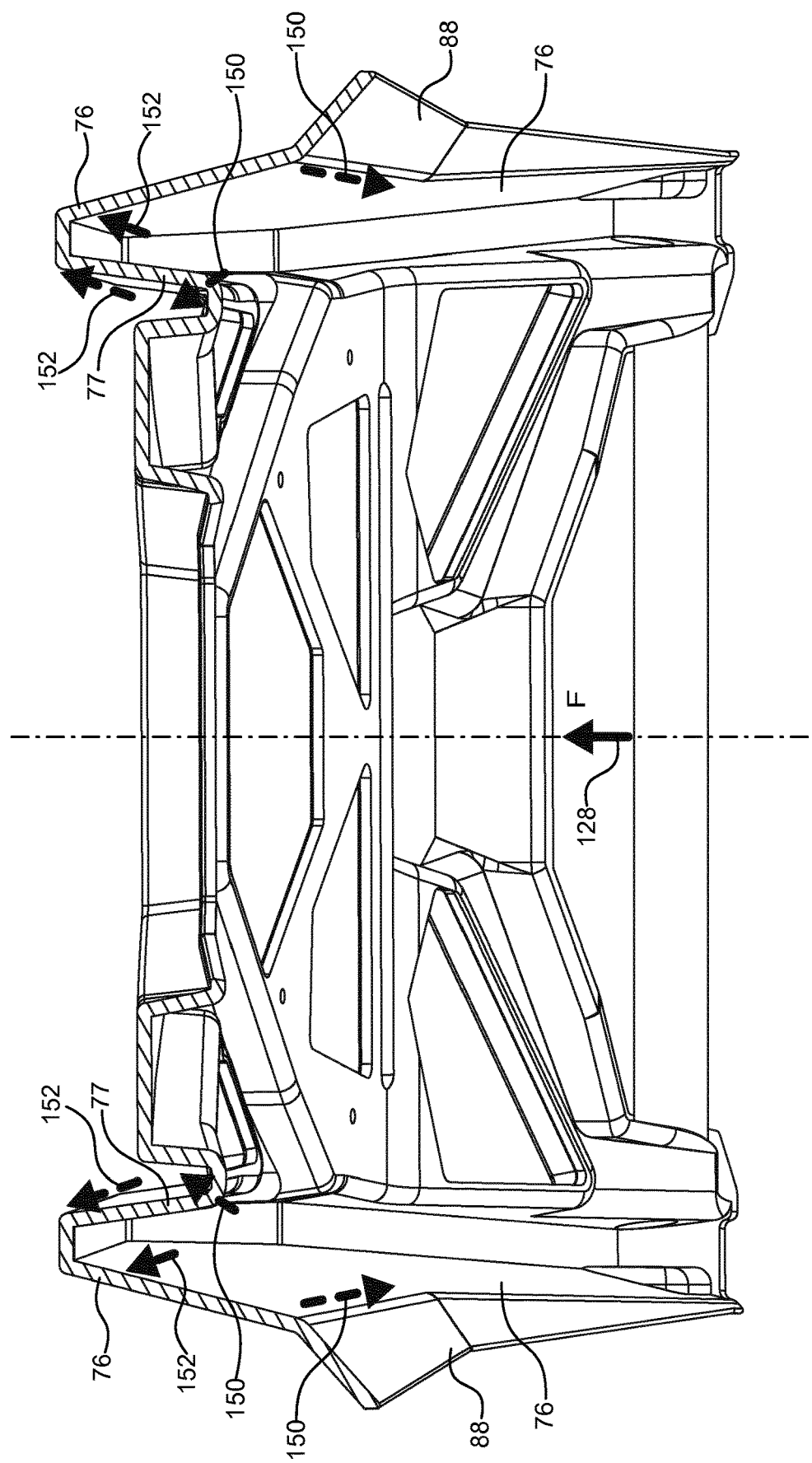
FIG. 6C is the cross-sectional view of the part of the resilient part of FIG. 6B, taken along section line 6B-6B of FIG. 6A, the resilient part being lifted off the ground and resisting upward bending.
Figure 7:
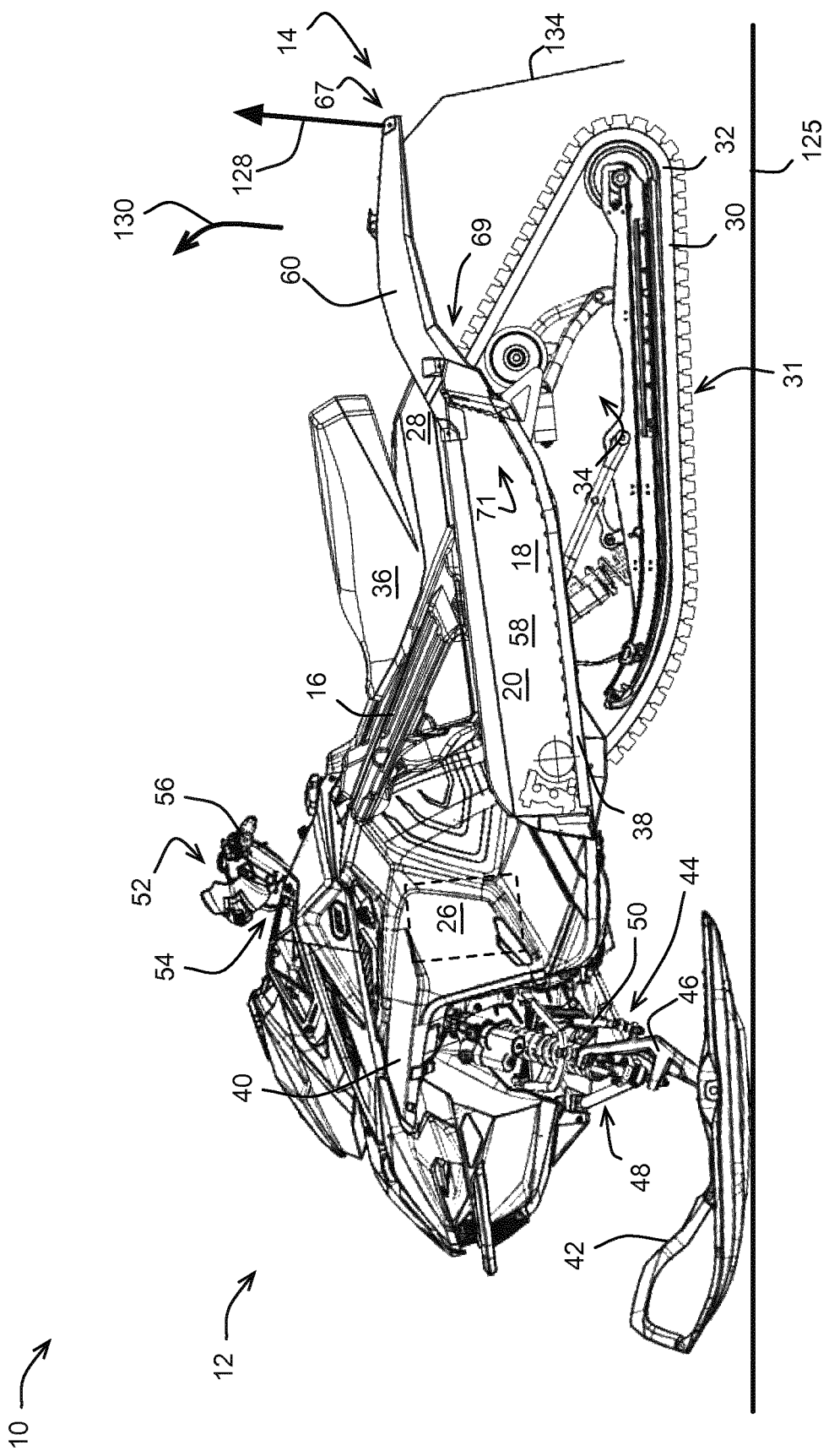
FIG. 7 is a left side elevation view of the snowmobile of FIG. 1, with a rear end thereof being lifted off the ground.

Now referring to FIGS. 6C and 7, to assist in lifting the rear end 14 of the snowmobile 10, the resilient part 60 of the tunnel 18 is provided with a bumper 132. In the present embodiment, the bumper 132 is in the form of a cylindrical bar and is connected between the rear ends of the left and right side ribs 68. The bumper 132 makes it easier for a user to grasp the resilient part 60 with both hands for lifting the rear of the snowmobile 10. In the present embodiment, the bumper 132 is made of an aluminium alloy, but a different material could be used. It is also contemplated that the bumper 132 could be manufactured integral with the resilient part 60.

Still referring to FIGS. 6C and 7, applying an upward force 128 to the rear end 63 of the resilient part 60, such as by pulling upward on the bumper 132, puts the bottom parts of the sidewalls 76, 77 of the side ribs 68 as well as the lips 88 of the resilient part 60 in tension. The same upward force 128 puts the upper parts of the sidewalls 76, 77 and the upper walls 78 in compression. Upper wall 78 adds rigidity to the upper parts of sidewalls 76 and 77 which increases the resistance of the side walls 76 and 77 to buckling inward toward each other and thus the inverted U-shape 74 created with sidewalls 76, 77 and 78 remains in its original configuration 126 under the upward force 128 needed to lift the rear end 14 of the snowmobile 10. FIG. 6C schematically shows some of the forces 150, 152 experienced by the resilient part 60 in the lifted-off-the-ground position as a result of the upward force 128. As shown, the forces 150, 152 include tension forces 150 borne by the bottom parts of the inner and outer sidewalls 76, 77 and the lips 88, and compression forces 152 borne by the upper portions of the inner and outer sidewalls 76, 77, and the upper walls 78.

The bottom parts of the sidewalls 76, 77 and the lips 88, due to the shape thereof described herein above, resist tension more than compression. As a result, the resilient part 60 sufficiently resists materially bending in an upward direction 130 to allow a user to lift the rear end 14 of the snowmobile 10 by the rear end 63 of the resilient part 60 without materially bending the resilient part 60 in the upward direction 130 beyond its original configuration 126.

FIG. 7 shows the rear end 14 of the snowmobile 10 being lifted off the ground 125 by the rear end 63 of the resilient part 60. As shown, in this position, the resilient part 60 remains substantially in the original configuration 126.

Modifications and improvements to the above-described implementations of the present technology may become apparent to those skilled in the art. The foregoing description is intended to be exemplary rather than limiting.

The invention claimed is:

1. A snowmobile comprising:
   a frame, the frame including a tunnel;
   at least one ski operatively connected to the frame;
   a motor supported by the frame;
   an endless drive track operatively connected to the motor for propelling the snowmobile; and
   a bumper,
   the tunnel extending above the endless drive track in a longitudinal direction, the tunnel having a first part and a second part, a front end of the second part being connected to a rear end of the first part, the second part extending rearward from the first part, the bumper being connected to a rear end of the second part,
   the first part being made of a first material,
   the second part being made of a second material, the second material being different from the first material, the second material being resilient,
   when a downward force is applied to a rear end of the second part, the second part bends downward from an original configuration such that at least the bumper moves toward the endless drive track, and
   the second part returning at least approximately to its original configuration after removal of the downward force.

2. The snowmobile of claim 1, wherein when an upward force is applied to the rear end of the second part, the second part resists bending upward to allow a user to lift a rear end of the snowmobile by the rear end of the second part.

3. The snowmobile of claim 1, wherein the second part returns to its original configuration after the downward force is removed.

4. The snowmobile of claim 1, further comprising a snow flap connected to the second part of the tunnel and extending at least in part downward from the rear end of the second part.

5. The snowmobile of claim 1, wherein the second part of the tunnel includes:
   at least two ribs extending in the longitudinal direction, each of the at least two ribs having an inverted-U shape; and
   a web connected to the at least two ribs along at least a portion of a length of each of the at least two ribs.

6. The snowmobile of claim 5, wherein each of the at least two ribs includes an outer sidewall facing away from a longitudinal center plane of the snowmobile, an inner sidewall facing toward the longitudinal center plane, and an upper wall connecting the outer sidewall at a top end thereof to the inner sidewall at a top end thereof.

7. The snowmobile of claim 6, wherein:
   the outer sidewall flares away from the inner sidewall as the outer sidewall extends downward from the upper wall;
   the outer sidewall is flat when the second part of the tunnel is in the original configuration; and
   the inner sidewall is flat when the second part of the tunnel is in the original configuration.

8. The snowmobile of claim 7, wherein:
   the upper wall comprises a plurality of flat sections;
   the outer sidewall extends away from the longitudinal center plane as the outer sidewall extends downward from the upper wall; and
   the inner sidewall extends toward the longitudinal center plane as the inner sidewall extends downward from the upper wall.

9. The snowmobile of claim 6, wherein:
   each of the at least two ribs includes a lip; and
   for each lip of each of the at least two ribs:
      a top end of the lip is connected along a bottom edge of the outer sidewall; and
      the lip extends away from the longitudinal center plane as the lip extends downward from the outer sidewall.

10. The snowmobile of claim 9, wherein the lip comprises a plurality of flat sections, the top end of the lip defining a top end of each flat section of the plurality of flat sections.

11. The snowmobile of claim 6, wherein a part of each of the outer sidewalls flares away from the longitudinal center plane when the second part bends downward from the original configuration.

12. The snowmobile of claim 5, wherein:
   the at least two ribs include a left side rib and a right side rib;
   a front end of the left side rib is connected at a rear left corner of the first part of the tunnel;
   a front end of the right side rib is connected at a rear right corner of the first part of the tunnel; and
   the web extends in the lateral direction between the left side rib and the right side rib and connects the left side rib to the right side rib.

13. The snowmobile of claim 12, wherein:
   the left side rib tapers from the front end of the left side rib to a rear end of the left side rib, and
   the right side rib tapers from the front end of the right side rib to a rear end of the right side rib.

14. The snowmobile of claim 12, wherein:
   the bumper is connected between rear ends of the left and right side ribs; and
   further comprising a light supported by the rear end of the second part.

15. The snowmobile of claim 12, wherein:
   the web is X-shaped; and
   the web has a front left extremity connected to the left side rib, a front right extremity connected to the right side rib, a rear left extremity connected to the left side rib rearward of the front left extremity, and a rear right extremity connected to the right side rib rearward of the front right extremity.

16. The snowmobile of claim 15, wherein when the second part bends downward from the original configuration, the second part bends between the front left and rear left extremities and between the front right and rear right extremities.

17. The snowmobile of claim 15, wherein:
   the X-shaped web is symmetric about a longitudinal center plane of the snowmobile; and
   the X-shaped web is positioned closer to the front end of the second part of the tunnel than to the rear end of the second part of the tunnel.

18. The snowmobile of claim 12, wherein the second part tapers as the second part extends rearward from the first part.

19. The snowmobile of claim 1, wherein when the second part bends downward from the original configuration, the second part bends at a location that is closer to the front end of the second part of the tunnel than to the rear end of the second part of the tunnel.

20. The snowmobile of claim 1, wherein the front end of the second part of the tunnel is removably connected to the rear end of the first part of the tunnel.

* * * * *